(12) United States Patent
Huang et al.

(10) Patent No.: US 11,449,625 B2
(45) Date of Patent: Sep. 20, 2022

(54) OPTIMIZED DIRECTORY ENUMERATION AND DATA COPY FOR CLIENT DRIVE REDIRECTION IN VIRTUAL DESKTOPS

(71) Applicant: VMware, Inc., Palo Alto, CA (US)

(72) Inventors: Weigang Huang, Beijing (CN); Eric Yueting Zhang, Beijing (CN); Hui Yuan, Beijing (CN); Hui Zhang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 86 days.

(21) Appl. No.: 17/183,774

(22) Filed: Feb. 24, 2021

(65) Prior Publication Data

US 2022/0229922 A1 Jul. 21, 2022

(30) Foreign Application Priority Data

Jan. 18, 2021 (WO) ................ PCT/CN2021/072445

(51) Int. Cl.
*G06F 21/62* (2013.01)
*H04L 67/141* (2022.01)
*H04L 67/563* (2022.01)
*H04L 67/568* (2022.01)
*H04L 67/01* (2022.01)

(52) U.S. Cl.
CPC ........ *G06F 21/6218* (2013.01); *G06F 21/629* (2013.01); *H04L 67/141* (2013.01); *H04L 67/563* (2022.05); *H04L 67/568* (2022.05); *H04L 67/01* (2022.05)

(58) Field of Classification Search
CPC . G06F 21/6218; G06F 21/629; H04L 67/141; H04L 67/563; H04L 67/568; H04L 67/01
See application file for complete search history.

(56) References Cited

U.S. PATENT DOCUMENTS

| | | | |
|---|---|---|---|
| 8,131,825 B2* | 3/2012 | Nord | G06F 16/10 709/219 |
| 2016/0342519 A1* | 11/2016 | Liashenko | G06F 12/0871 |
| 2016/0352750 A1* | 12/2016 | Dotan | H04L 63/0838 |
| 2017/0235950 A1* | 8/2017 | Gopalapura Venkatesh | H04L 67/1097 726/24 |
| 2018/0113676 A1* | 4/2018 | De Sousa Webber | G06F 40/205 |

(Continued)

OTHER PUBLICATIONS

"IFileOperation interface (shobjidl_core.h)"; Published Dec. 5, 2018; https://docs.microsoft.com/en-us/windows/win32/api/shobjidl_core/nn-shobjidl_core-ifileoperation; Retrieved Feb. 24, 2021.

(Continued)

*Primary Examiner* — Michael A Keller
*Assistant Examiner* — Thao D Duong

(57) ABSTRACT

System and methods are provided for improved directory enumeration and data copy with shared client directories in virtual desktops by quickly and efficiently retrieving shared directory entries from the client device over a separate fast channel and caching them on the virtual desktop, where the directory entries can be available locally to applications in the virtual desktop for performing directory enumeration. The fast channel can further be utilized for efficiently transferring data in data copy operations between the client device and the virtual desktop.

20 Claims, 7 Drawing Sheets

(56) References Cited

U.S. PATENT DOCUMENTS

2020/0204589 A1\* 6/2020 Strogov ................ G06N 20/00
2022/0100582 A1\* 3/2022 Lal ....................... G06F 9/5077
2022/0156303 A1\* 5/2022 De Sousa Webber ......................
G06F 16/334

OTHER PUBLICATIONS

"ICopyHook::CopyCallback method"; Published Apr. 30, 2018; https://docs.microsoft.com/en-us/previous-versions/windows/desktop/legacy/bb776048(v=vs.85)?redirectedfrom=MSDN; Retrieved Feb. 24, 2021.

\* cited by examiner

OPTIMIZED DIRECTORY ENUMERATION AND DATA COPY FOR CLIENT DRIVE REDIRECTION IN VIRTUAL DESKTOPS

CLAIM OF PRIORITY

This application is based upon and claims the benefit of priority from International Patent Application No. PCT/CN2021/072445, filed on Jan. 18, 2021, which is incorporated by reference herein in its entirety.

TECHNICAL FIELD

The present disclosure generally relates to virtual desktop infrastructure and more specifically to techniques for efficient directory enumeration and data copy in client drive redirection for virtual desktops.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server which is linked to the local client device over a network using a remote display protocol, such as remote desktop protocol (RDP), PC-over-IP protocol (PCoIP), virtual network computing (VNC) protocol, or the like. Using the remote desktop protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

Generally, a virtual desktop's data is stored on the host server (e.g., in a virtual disk) where it is accessed locally by the virtual desktop during execution. Increasingly more and more often, however, virtual desktops today also provide a feature, referred to herein as client drive redirection (CDR), that enables users to access files and folders located on the client device from within the virtual desktop session. With client drive redirection, a user can share files, folders and drives located on the local client system with the remote desktop. For example, a user can allow applications running in the virtual desktop on the host server to access documents and data that are stored on the user's client device. To implement this feature, a CDR component is utilized that forwards input/output (I/O) requests from the virtual desktop to the shared directory on the client device over the network.

However, because I/O operations in CDR are redirected from the virtual desktop to the client device and travel over the network, which can exhibit latencies, performance of certain tasks can be significantly delayed. Enumeration of shared directories located on the client device during access is particularly prone to such delays. When a directory is accessed, whether to read or write a file or to copy content, the directory is first enumerated, which requires numerous sequential requests and responses as the system retrieves directory entries. The number of such requests and responses can be particularly large in cases where the directory contains many files and subdirectories. When a virtual desktop accesses a shared directory on a client device in CDR, these requests travel over the network between the virtual desktop and the client device. As a result, the performance of tasks that involve directory enumeration, such as file accesses and copying, can be particularly poor in CDR, particularly in cases where the shared directory contains a large number of files and subdirectories.

Further, when performing data copy operations using CDR, for example when a file or folder is copied from the client device to the virtual desktop, the operation can be delayed not only because directory enumeration must be performed over the network before the data can be accessed, but for other reasons as well. In some operating systems, such as Windows, available from Microsoft Corporation, data copy is performed by a file manager application that uses only one thread (e.g., Microsoft Windows Explorer) and the copying is performed in a sequential manner. As a result, even where the host utilizes multiple processors and cores, the processing capacity cannot be fully utilized to accelerate the copy process. In such cases, data copy performance in CDR can be particularly poor because delays are incurred not only during directory enumeration but also during the data copy process.

What is needed is a more efficient way for performing directory enumeration and data copy when utilizing client drive redirection in virtual desktops.

DETAILED DESCRIPTION

Figure 1:
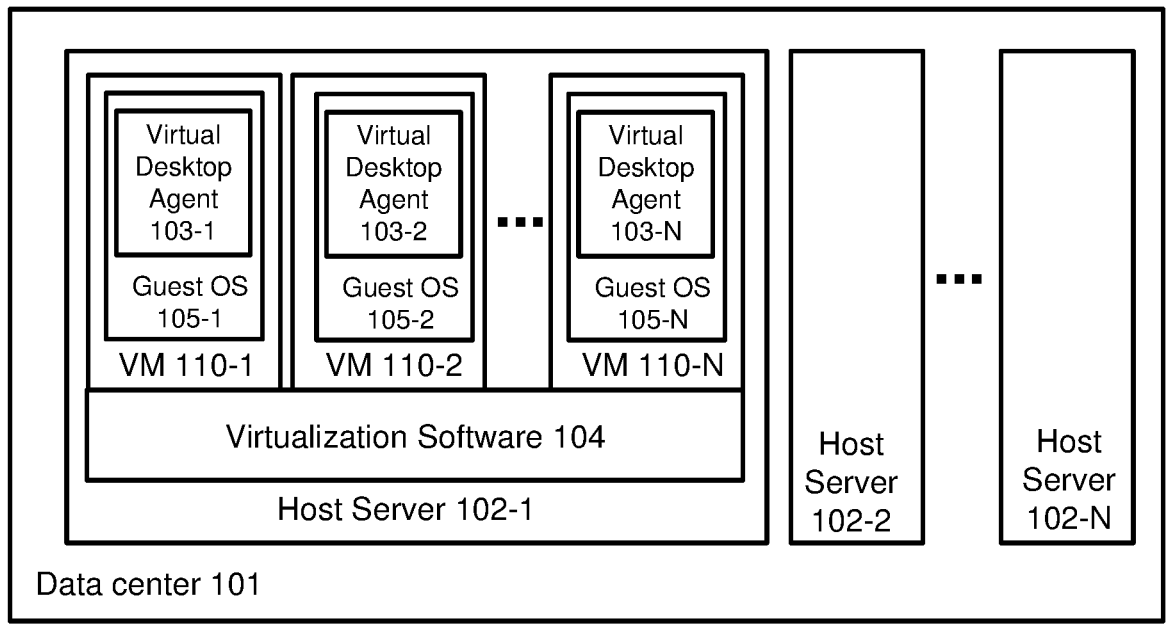
FIG. 1 illustrates an example of a virtual desktop environment, in accordance with various embodiments.
Figure 1:
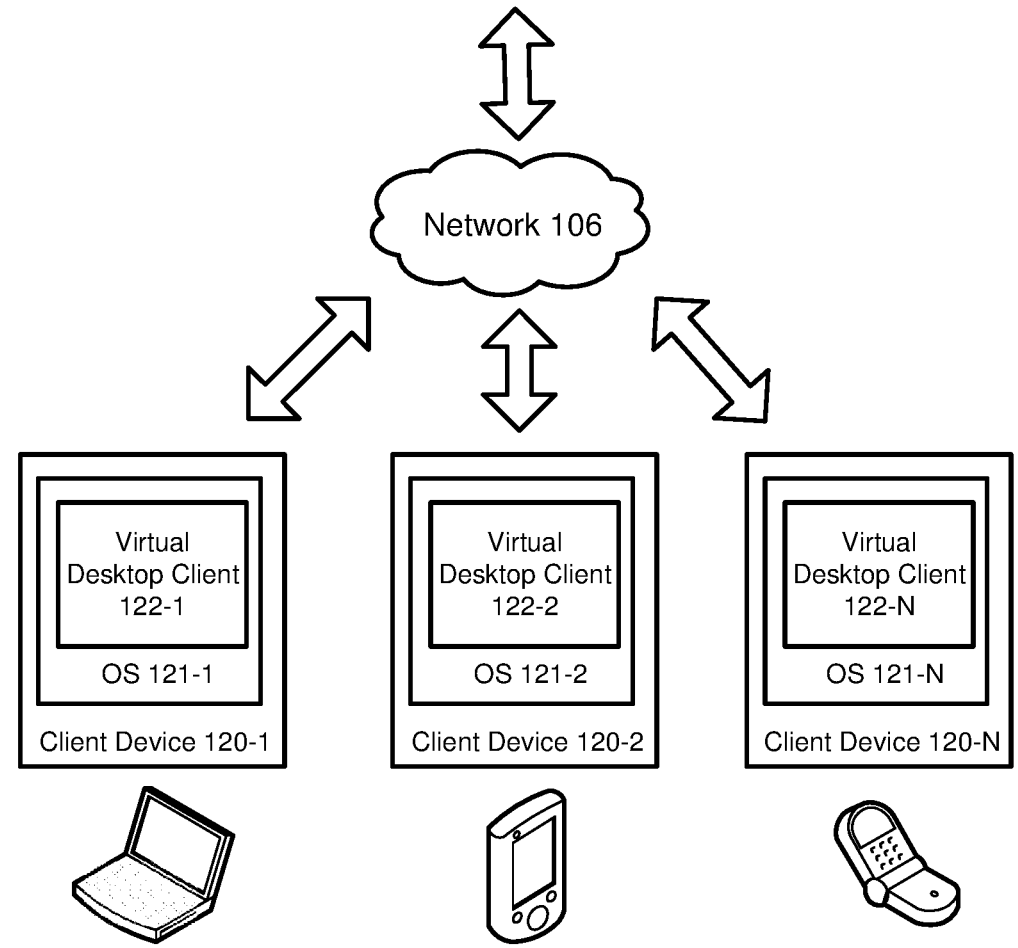

Systems and methods in accordance with various embodiments of the present disclosure overcome at least some of the above-mentioned shortcomings and deficiencies by providing more efficient ways to perform directory enumeration and data copy in client drive redirection (CDR) on virtual desktops. In particular, embodiments described herein leverage a CDR accelerator that executes on the virtual desktop and intercepts a request produced by an application on the virtual desktop to open a shared directory located on the client device. The CDR accelerator can request directory enumeration information for the shared directory from the client device and the directory enumeration information can be conveyed to the CDR accelerator over a fast side channel from the client device. The CDR accelerator can cache the directory enumeration information in a local directory cache on the virtual desktop. Subsequently, the CDR accelerator can intercept and complete any requests for directory enumeration information from the application or from other applications accessing the same directory directly using the cached directory enumeration information. As a result, directory enumeration can be performed quickly and efficiently without the delays caused by numerous cross-network requests and responses between the virtual desktop and the client device that are incurred in existing CDR systems.

Further, the fast channel established between the virtual desktop and the client device can be utilized to accelerate data copy operations. As mentioned above, some file manager applications, such as Windows Explorer, use only one thread for data copy. As a result, data copy operations are performed in a sequential or one-by-one manner, which greatly limits copy speed. In various embodiments, the same fast channel used for accelerating directory enumeration can be leveraged to improve performance when data is copied client-to-agent or agent-to-client by transferring the data over the fast channel.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a standalone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Generally, the data of a virtual desktop, such as application and user data, is stored on the host server (e.g., 102-1, 102-2, 102-N) (e.g., in a virtual disk) where it is accessed locally by the VM (e.g., 110-1, 110-2, 110-N) during execution. To enable the virtual desktop to also access data located on a client device (e.g., 120-1, 120-2, 120-N), virtual desktops can utilize a feature referred to herein as client drive redirection (CDR), which enables the virtual desktop to access files and folders located on the client device (e.g., 120-1, 120-2, 120-N) from within the virtual desktop session. Hence, applications running in the VM (e.g., 110-1, 110-2, 110-N) can access files, folders and drives located on the remote client (e.g., 120-1, 120-2, 120-N). For example, a user can allow applications running in the virtual desktop on the host server (e.g., 102-1, 102-2, 102-N) to access documents and data that are stored on the user's client device (e.g., 120-1, 120-2, 120-N). Similarly, the user can copy data from the client device (e.g., 120-1, 120-2, 120-N) to a location (e.g., directory) physically located on the host server (e.g., 102-1, 102-2, 102-N), or the user can copy data from the virtual desktop on the host server (e.g., 102-1, 102-2, 102-N) to the client device (e.g., 120-1, 120-2, 120-N).

With the CDR feature, data located on the client device (e.g., 120-1, 120-2, 120-N) can be presented in virtual drives in the VM (e.g., 110-1, 110-2, 110-N). For example, directories, files, or drives located on the client device (e.g., 120-1, 120-2, 120-N) can be presented in virtual drives in the virtual desktop. Users can work with the virtual drives in the same way they work with disk drives that are local on the host server (e.g., 102-1, 102-2, 102-N), and applications running in the virtual desktop can likewise access the virtual drives in the same way as local drives on the host server (e.g., 102-1, 102-2, 102-N). When an input/output (I/O) request is produced on the virtual desktop (e.g., by an application in the virtual desktop) to a shared directory located on the client device (e.g., 120-1, 120-2, 120-N), a CDR component running in the virtual desktop can forward the I/O request to the client device (e.g., 120-1, 120-2, 120-N) over the network. A corresponding client-side CDR component on the client device (e.g., 120-1, 120-2, 120-N) can receive and implement the I/O request, whether by retrieving data and sending it back to the virtual desktop, by writing to a file on the client device (e.g., 120-1, 120-2, 120-N), etc. as the case may be.

When a shared client-side directory is accessed on the virtual machine, the directory first needs to be enumerated. As mentioned above, in a traditional remote desktop deployment that implements CDR, the process of directory enumeration on a shared client directory can require a significant number of sequential requests and responses that are sent back and forth between the virtual desktop and the client device (e.g., 120-1, 120-2, 120-N) over the network. For example, first the system may need to verify if a directory exists, then it may need to obtain metadata information such as the time stamp for the folder and its size, and this may need to be performed for each contained file and subdirectory. When the directory is enumerated, the system (e.g., the application making the directory access) may further need to identify each entry in the directory, which may require a separate request and response. Particularly where the directory being opened has a large number of entries (files and/or subdirectories), this process can consume a long time and have detrimental effects on performance.

Figure 2:
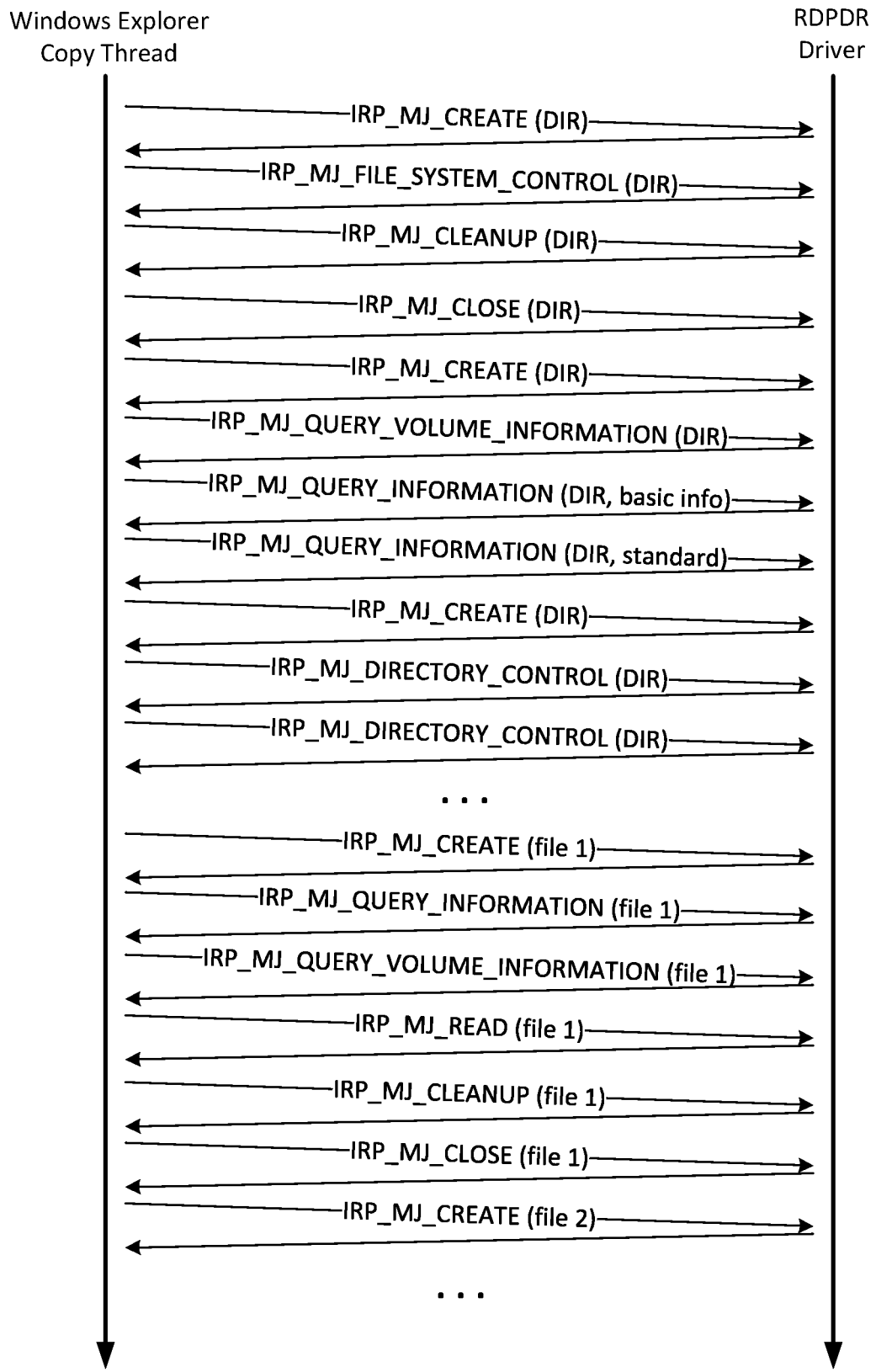
FIG. 2 illustrates an example of requests produced during directory enumeration in client drive redirection (CDR) in a Windows operating system, in accordance with various embodiments.

FIG. 2 illustrates an example of requests produced during directory enumeration in client drive redirection (CDR) in a Windows operating system, in accordance with various embodiments. The example of FIG. 2 illustrates requests produced by Windows Explorer that is executing in a virtual desktop and is copying a shared directory located on a remote client device to the virtual desktop. As illustrated, the Windows Explorer initiates a copy thread that sends a series of IRPs (Input/Output request packets) to an RDPDR (Microsoft Remote Desktop Protocol Device Redirector) driver also executing in the virtual desktop. The RDPDR driver converts each IRP it receives into a remote desktop protocol (RDP) packet (RDP message) and forwards it to the client side. The RDPDR driver receives a response to the RDP message from the client over the network and conveys it to the Windows Explorer, as illustrated by the corresponding arrows from the RDPDR driver to the Windows Explorer in the example of FIG. 2.

As illustrated, when the directory is being opened, even before directory enumeration is started, a number of IRPs are sent to client file system, including IRP_MJ_CREATE, IRP_MJ_FILE_SYSTEM_CONTROL, IRP_MJ_QUERY_VOLUME_INFORMATION, IRP_MJ_QUERY_INFORMATION, IRP_MJ_CLEANUP, IRP_MJ_CLOSE, etc. After directory enumeration begins, there are several IRP_MJ_DIRECTORY_CONTROL IRPs sent and replied to. With existing technology, the RDPDR driver merely converts each IRP it receives into an RDP protocol packet (RDP message) and forwards it to the client side in sequence, without optimization. Typically, each IRP_MJ_DIRECTORY_CONTROL reads back a single directory entry. Hence, when the directory contains numerous child directories and files, and especially if the network bandwidth is not ideal, the RDPDR driver spends a long time sending many RDP protocol packets and reading back each directory entry, leading to poor and slow performance. While this example illustrates a copy operation performed by Windows Explorer, other applications on the virtual desktop can undergo a similar process of directory enumeration when accessing shared directories on the client device via CDR for purposes other than copying, and performance can be similarly negatively impacted.

Figure 3:
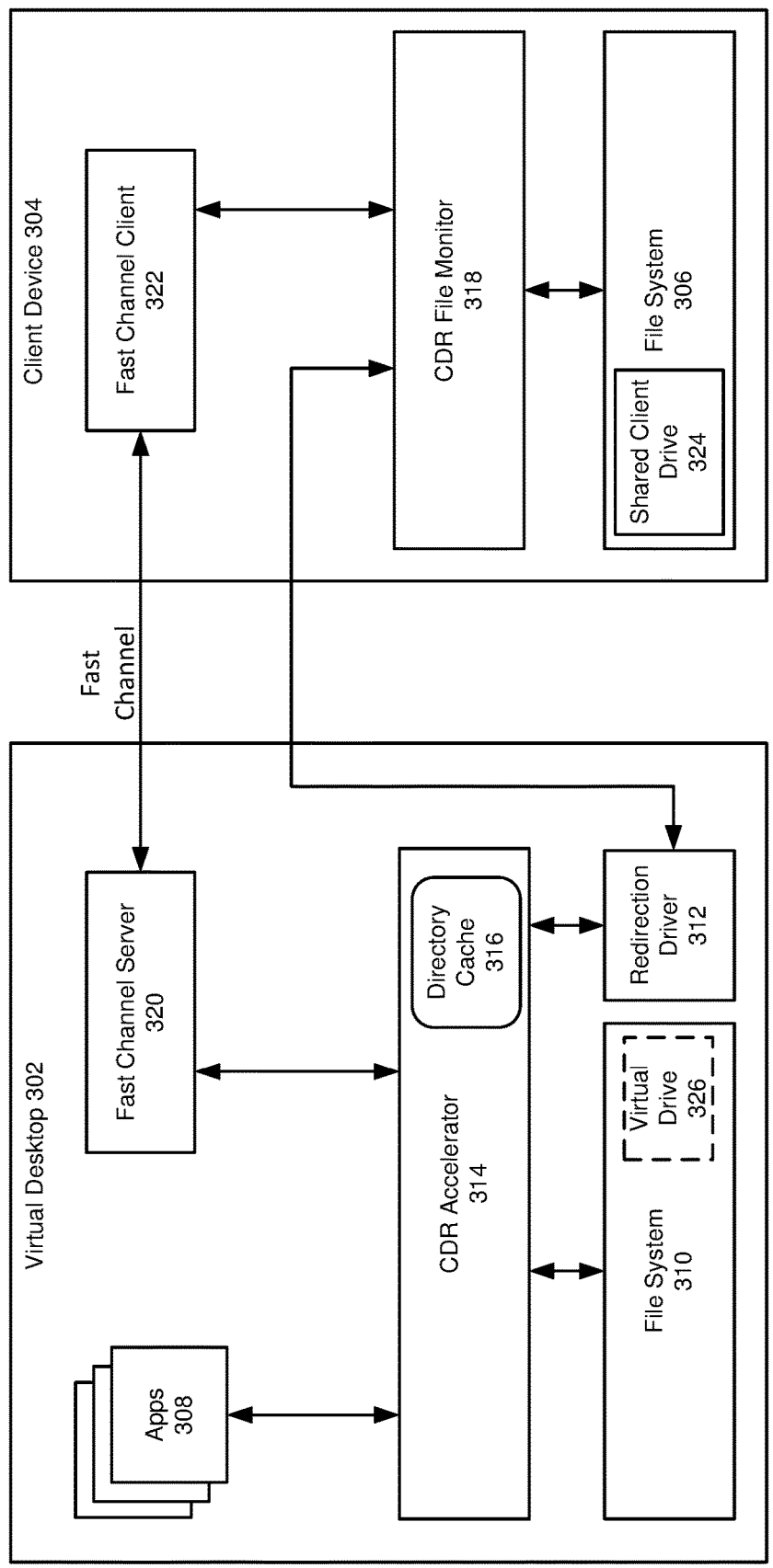
FIG. 3 illustrates an example architecture of a system for more efficient directory enumeration in client drive redirection on virtual desktops, in accordance with various embodiments.

FIG. 3 illustrates an example architecture of a system for more efficient directory enumeration in client drive redirection on virtual desktops, in accordance with various embodiments. In the example of FIG. 3, a virtual desktop 302 is connected to a client device 304 over a network during a virtual desktop session. Several applications 308 can execute on the virtual desktop 302. The client device 304 can contain a file system 306, which can be an NTFS/FAT32 file system, and the server can also contain a file system 310, which can also be an NTFS/FAT32 file system. The virtual desktop 302 and the applications 308 can access the file system 310 locally in the virtual desktop. The client file system 306 or portions of it (e.g., drives, directories, folders, files, etc.) can also be made available for access to the virtual desktop 302 and the applications 308 via CDR. For example, a virtual drive 326 can be presented in the virtual desktop that provides access on the virtual desktop to certain directories, volumes, folders, files, etc. that are on a shared client drive 324 in the client device file system 306. In various embodiments, the shared client drive 324 may be configured (e.g., by an administrator or by the user) to share certain directories, folders, etc., and those portions can be presented in the virtual drive 326 for access by the virtual desktop 302.

The virtual desktop 302 (or an application 308 in the desktop) can access the shared client drive 324 by producing an input/output (I/O) request targeting the virtual drive 326. For example, an application 308 can produce a read or write request to a file in the virtual drive 326 and the request can be routed to the shared client drive 324 by a redirection driver 312. In an embodiment utilizing the Windows operating system (OS) the driver can for example be an RDPDR driver. Hence, I/O requests to the virtual drive 326 can be forwarded to or intercepted by the redirection driver 312 and conveyed to the shared client drive 324. Responses to application 308 requests forwarded by the redirection driver 312 can be routed back from the client 304 to the requesting applications 308 through the redirection driver 312.

As mentioned, with existing CDR technology, opening a directory in the shared client drive 324, especially when it accommodates many files and subdirectories, can take a long time due to numerous back-and-forth requests and responses sent and received by the redirection driver 312 over the network between the virtual desktop 302 and the client 304 during directory enumeration. To improve CDR performance, the systems and methods described herein provide ways for quickly and efficiently retrieving directory enumeration information from the client device 304 over a separate fast channel and caching it on the virtual desktop 302, where the directory enumeration information can be available (e.g., locally) to applications 308. To achieve this, two file system filter drivers (or minifilters) can be implemented, one on the virtual desktop side and one on the client 304. On the virtual desktop 302 side, a CDR accelerator 314 filter can be implemented, which is responsible for querying and caching the directory enumeration information. The CDR accelerator 314 can also include a directory cache 316, where directory enumeration information retrieved from the client 304 can be cached.

On the client 304 side, a CDR file monitor 318 filter can be implemented, which can be responsible for capturing directory content changes that occur in the shared client drive 324 and for syncing the changes with the directory cache 316 in the CDR accelerator 314. When a directory or file in the shared client drive 324 is changed causing a change in a directory's enumeration information, the delta (or differences) to the directory enumeration information that results can be sent to the virtual desktop 302 and incorporated into the directory cache 316; thus keeping the directory enumeration information in the cache 316 synced and current.

The example of FIG. 3 further includes a side channel, which can be a fast channel for transmitting directory enumeration information and file data. The fast channel can be established between a fast channel server 320 on the virtual desktop 302 and a fast channel client 322 on the client device 304. The fast channel server 320 and the fast channel client 322 can be a TCP server and TCP client, respectively. In various embodiments, the fast channel can be any kind of channel for transferring data between the client 304 and the virtual desktop 302 that is outside of the remote desktop protocol (which is used to transfer user inputs, GUI data, etc.) In one embodiment, the fast channel is a virtual channel as defined in a remote display protocol used to deliver the virtual desktop or virtual applications to the client device, such as the PC-over-IP (PCoIP) protocol or the Blast Extreme protocol. In such remote display protocols, one virtual channel is used to stream the virtual desktop interface from the virtual desktop agent to the virtual desktop client, while a separate virtual channel is used to transmit the user input data from the virtual desktop client to the virtual desktop agent. Similarly, additional virtual channels can be established to share other data between the virtual desktop client and the virtual desktop agent. For example, the fast channel can transmit directory enumeration information and file data (e.g., during data copy from the client 304 to the virtual desktop 302 and vice versa).

In various embodiments, directory enumeration information can refer to information describing the structure, content, file lists, and various other aspects of the directory and its contained files and subdirectories. For example, directory enumeration information can comprise the metadata of the directory, metadata of contained files, and metadata of contained subdirectories. The information can include directory entries and data such as creation time, last access time, file size, etc.

In various embodiments, directory enumeration information delivered over the fast channel by the fast channel client 322 to the CDR accelerator can be composed of a linear array of directory entries with each entry in the format of DirEntry as shown below:

```
struct DirEntry {
    ULONG NextEntryOffset;
    LARGE_INTEGER CreationTime;
    LARGE_INTEGER LastAccessTime;
    LARGE_INTEGER LastWriteTime;
    LARGE_INTEGER ChangeTime;
    LARGE_INTEGER EndOfFile;
    LARGE_INTEGER AllocationSize;
    ULONG FileAttributes;
    ULONG FileNameLength;
    WCHAR FileName[1];
};
```

The fast channel client 322 can fetch (e.g., by querying the shared client drive 324) the corresponding directory entries and send them across the fast channel to the fast channel server 320 when requested, as will be described in more detail below. In various embodiments, for performance and efficiency, each directory entry may not contain a short file name, meaning that there would not be short name support.

In various embodiments, the fast channel can be established once the virtual desktop session is established; that is, after the remote desktop client (not pictured) connects to the virtual desktop agent (not pictured). The fast channel client 322 can then launch the CDR file monitor 318. The client device 304 can initialize folder sharing and the CDR file monitor 318 can attach a filter instance to the file system stack based on which volume(s) the shared drive 324 is located to perform its corresponding functions, such as monitoring and capturing directory content changes that occur on the shared drive 324 and syncing the changes with the directory cache 316 in the CDR accelerator 314. The CDR file monitor 318 can begin monitoring and capturing directory content changes that occur on the shared drive 324 in order to keep them synced with the corresponding cached directory entries in the directory cache 316 on the virtual desktop 302. The redirection driver 312 (e.g., RDPDR driver in a Windows system) on the virtual desktop can also start to work and the CDR accelerator 314 can automatically attach to the virtual drive 326 to monitor accesses to the virtual drive 326.

The process can begin when an application 308 attempts to open a directory in the virtual drive 326. For example, in the Windows OS the application can produce a directory open request, such as IRP_MJ_CREATE. The directory open request would typically be conveyed to the redirection driver 312, which would forward the request to the client 304, as described previously. Instead, The CDR accelerator 314 can detect and intercept the directory open request before it comes to the redirection driver 312 and check if cached directory enumeration information can be found for the target directory in the directory cache 316. If cached directory enumeration information is found, then the directory open request can be completed directly using the cached directory enumeration information.

Otherwise, if cached directory enumeration information is not found, the CDR accelerator 314 can put the directory open request into a pending state and notify the fast channel server 320 to fetch the directory enumeration information for the target directory. The fast channel server 320 can send the directory enumeration information request to fast channel client 322, which in turn can call a file system 306 API to return the directory enumeration information back to the fast channel client 322. In various embodiments, the fast channel client 322 can then pack the received directory enumeration information or received directory entries into a linear array, such as DirEntry described above. The fast channel client 322 can send the directory enumeration information to the fast channel server 320, and the fast channel server 320 can convey the data down to the CDR accelerator 314, for example via an IOCTL/FltMessage. The CDR accelerator 314 can cache the received directory enumeration information in the directory cache 316 and using the cached directory enumeration information, the CDR accelerator 314 can complete the original pended directory open request.

In the Windows system, one way to complete a directory open IRP is for the CDR accelerator 314 to update the file name in FILE_OBJECT and return STATUS_REPARSE, and the I/O manager will reissue a new IRP_MJ_CREATE IRP. However, this may have some efficiency loss. Another approach is to assign a fake RDPDR file ID and complete the IRP directly. The latter approach may be more efficient.

Once the directory is opened, the application (e.g., 308) can start to enumerate the opened directory. When additional requests for directory enumeration information are made by the application 308, those requests can likewise be intercepted by the CDR accelerator 314 and the CDR accelerator 314 can complete the requests directly using the directory enumeration information in the directory cache 316. For example, in a Windows system, the CDR accelerator 314 can intercept the IRP_MJ_DIRECTORY_CONTRL request from the application 308 and, since the directory enumeration information has been cached, the CDR accelerator 314 can respond to the requests directly using the directory enumeration information in the directory cache 316, such as by directly filling in the IRP buffer and completing such IRP. Based on the cached directory enumeration information in the cache 316, the CDR accelerator 314 can similarly respond directly to other IRPs from the application 308 that are targeted to the directory or that request any part of the directory enumeration information. Examples of such IRPs can include the flowing: IRP_MJ_CREATE, IRP_MJ_FILE_SYSTEM_CONTROL, IRP_MJ_QUERY_INFORMATION, IRP_MJ_CLEANUP, IRP_MJ_CLOSE, etc. Because the various IRPs will no longer be forwarded to the client side, the time-consuming work performed by the redirection driver 312 (e.g., RDPDR driver) such as assembling and parsing RDP protocol packets and sending/receiving requests and responses over the network is greatly reduced, which can significantly enhance directory enumeration performance.

In an embodiment, instead of the CDR accelerator 314 putting the directory open request (e.g., the IRP_MJ_CREATE IRP) into a pending state, the system can proceed with handling the request along the standard route in parallel (i.e., by sending the request via the redirection driver 312 to the client 304) while it retrieves the directory enumeration information through the CDR fast channel. This may result in faster performance. In this case, the process again can begin with an application 308 attempting to open a directory in the virtual drive 326. For example, the application can produce a directory open request, such as IRP_MJ_CREATE in the Windows system. The CDR accelerator 314 can detect and intercept the directory open request before it comes to the redirection driver 312 and check if cached directory enumeration information could be found for the target directory in the directory cache 316. If cached directory enumeration information is found, then the directory open request can be completed directly using the cached directory entries.

Otherwise, if cached directory enumeration information is not found, the CDR accelerator 314 can notify the fast channel server 320 to fetch the directory enumeration information for the target directory and in parallel complete the directory open request while the directory enumeration information is being fetched. For example, the CDR accelerator 314 can forward the directory open request to the redirection driver 312, which can complete the directory open request by accessing the directory over the network (e.g., by routing the request to the client 304 and receiving a response, as described previously). In the meantime, the fast channel server 320 can send the directory enumeration information request to the fast channel client 322, which in turn can call a file system 306 API to return the directory enumeration information or directory entries back to the fast channel client 322. In various embodiments, the fast channel client 322 can then pack the directory enumeration information or directory entries into a linear array, such as DirEntry described above. The fast channel client 322 can send the directory enumeration information to the fast channel server 320, and the fast channel server 320 can convey the data down to the CDR accelerator 314, for example via an IOCTL/FltMessage. The CDR accelerator 314 can cache the received directory enumeration information in the directory cache 316.

Once the directory is opened, the application 308 can start to enumerate the opened directory. When additional requests for directory enumeration information are made by the application 308, those requests can likewise be intercepted by the CDR accelerator 314 and the CDR accelerator 314 can determine if the directory enumeration information has been cached. If the directory enumeration information has been cached, then the CDR accelerator 314 can respond to the requests directly based on the directory enumeration information in the directory cache 316. For example, in a Windows system, the CDR accelerator 314 can intercept the IRP_MJ_DIRECTORY_CONTRL request (and other IRPs) from the application 308 and, since the directory enumeration information has been cached, the CDR accelerator 314 can respond to the requests directly using the directory enumeration information in the directory cache 316, such as by directly filling in the IRP buffer and completing such IRP. If, on the other hand, after intercepting the request the CDR accelerator 314 determines that the directory enumeration information has not been cached, then the CDR accelerator 314 waits until the CDR fast channel sends down the directory enumeration information (e.g., via an IOCTL/FltMessage) and caches it. Once the directory enumeration information is cached, the CDR accelerator 314 can directly complete the requests using the cached information. In an embodiment, the CDR accelerator 314 can put a request into a pending state and wait until the directory enumeration information arrives over the fast channel so that it can complete the request directly using the directory enumeration information from the cache 316. In another embodiment, if the directory enumeration information is not available in the cache 316, the CDR accelerator 314 can complete the request while waiting for the directory entries to arrive over the fast channel, such as by forwarding the request to the redirection driver 312, which can complete the request by accessing the directory over the network (e.g., by routing the request to the client 304 and receiving a response, as described previously).

In various embodiments, after the directory enumeration information has been cached in the directory cache 316, the cached directory enumeration information can be updated when directory or file changes are made to the directory in the shared client drive 324 to keep the directory enumeration information synced with the shared directory. If such a directory or file change originates from client 304 side, for example if an application running on the client 304 (not pictured) makes such a change on the shared client drive 324, the CDR file monitor 318 (which can operate as a filter) can intercept the directory/file change and determine the resulting "change" or "delta" to the directory enumeration information. For example, the CDR file monitor 318 can determine what changes to the directory enumeration information of the shared directory (which is cached in the directory cache 316) are created by the intercepted directory/file change and this can be the change/delta. The CDR file monitor 318 can then notify the fast channel client 322 of the change/delta. The fast channel client 322 can send the change/delta to the fast channel server 320 in the virtual desktop 302 over the fast channel. The fast channel server 320 can inform (or send a message to) the CDR accelerator 314, e.g., via IOCTL/FltMessage, and the CDR accelerator 314 of the change/delta, and the CDR accelerator 314 can apply the change/delta to the directory enumeration information in the cache 316.

In some cases, the directory/file change to the directory in the shared client drive 324 can originate from the virtual desktop 302, such as where an application 308 on the virtual desktop makes the change via CDR. In this case, the CDR accelerator 314 can intercept the directory/file change and determine the change/delta to the directory enumeration information by itself. For example, the CDR accelerator 314 can determine what changes to the directory enumeration information of the shared directory (which is cached in the directory cache 316) are created by the directory/file change and this can be the change/delta. Then, the CDR accelerator 314 can update the directory enumeration information in the cache 316 and the client-side CDR file monitor 318 no longer needs to report the change back to the virtual desktop 302.

After the directory enumeration information for a shared directory is cached in the directory cache 316, if a different application on the virtual desktop attempts to open and enumerate the directory, the CDR accelerator 314 can intercept requests for directory enumeration information (whether the request is an open directory request, a request for a directory entry, etc.) from the application and complete the request based on the directory enumeration information in the cache 316.

In various embodiments, the CDR accelerator 314 can be configured to check the directory cache 316 for directory enumeration information whenever the CDR accelerator 314 intercepts an application 308 request for the directory enumeration information that is targeted to the virtual drive 326. Such requests can be any kind of request that requires a part of the directory enumeration information, such as a request to open the directory, or a request for a directory entry, etc. If the CDR accelerator 314 locates the directory enumeration information in the cache, then it can complete the request directly. If the CDR accelerator 314 does not locate the directory enumeration information in the cache, then it can request the directory enumeration information from the client. In an embodiment, the CDR accelerator 314 can suspend the request while the directory enumeration information is retrieved and cached, and then complete the request based on the cached directory enumeration information. In another embodiment, the CDR accelerator 314 can pass this request and subsequent requests for the directory enumeration information to the redirection driver 312 for completing the request (as described above) until the directory enumeration information is received and cached, at which point the CDR accelerator 314 can complete subsequent requests for the directory enumeration information directly based on the cached directory enumeration information.

Figure 4:
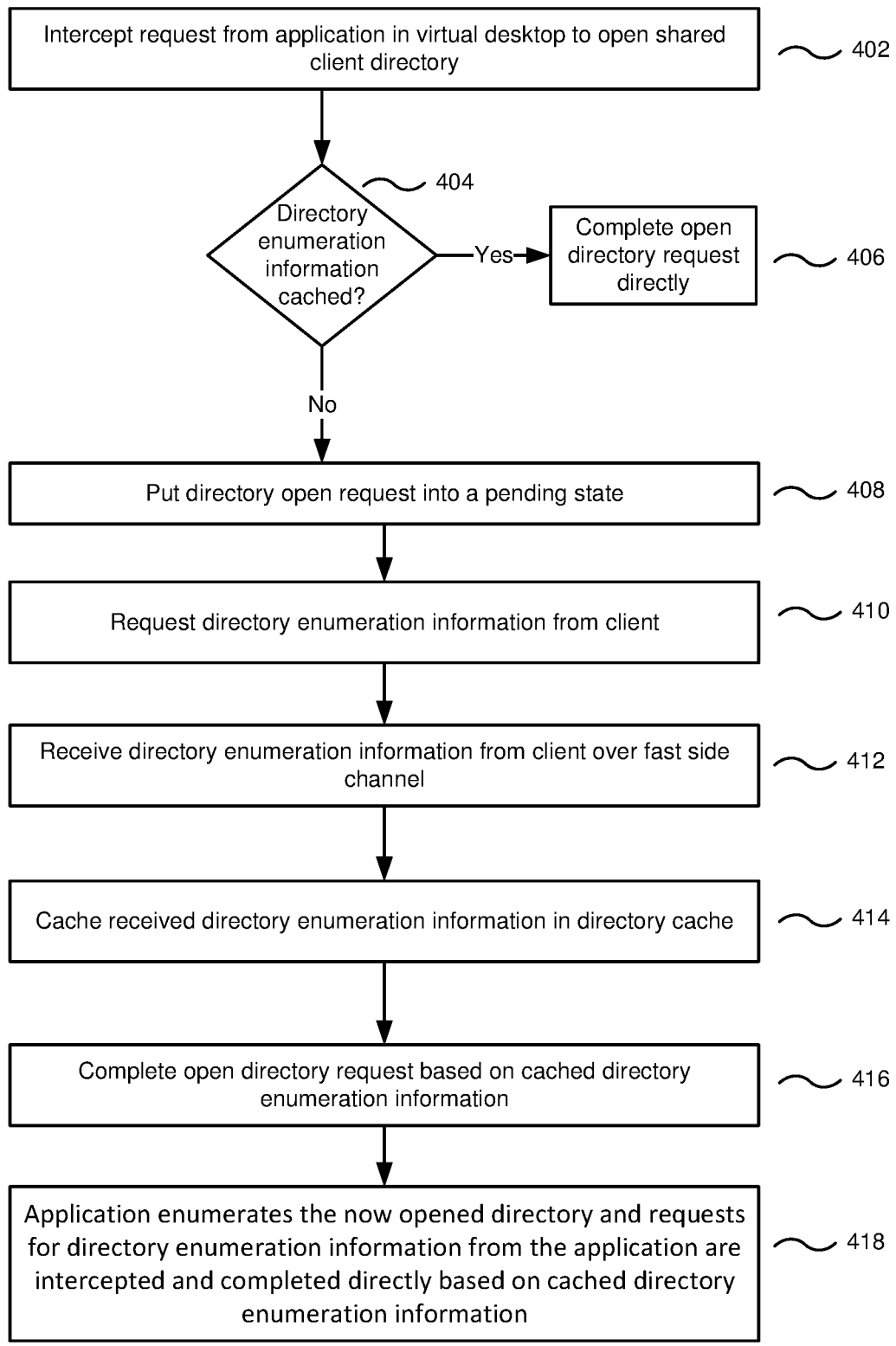
FIG. 4 illustrates an example process flow for more efficient directory enumeration in client drive redirection on virtual desktops, in accordance with various embodiments.

FIG. 4 illustrates an example process flow for more efficient directory enumeration in client drive redirection on virtual desktops, in accordance with various embodiments. For example, the process can take place in a virtual desktop environment that implements CDR to provide access on the virtual desktop to a shared client drive on the client device via a corresponding virtual drive that is presented to applications in the virtual desktop. As illustrated in the example of FIG. 4, the process can begin by intercepting a request from an application in the virtual desktop to open a shared client directory, in operation 402. For example, the application may be attempting to open a directory in the virtual drive. In operation 404, a decision can be made on whether directory enumeration information for the requested drive has been cached in the directory cache in the virtual desktop. If the directory enumeration information has been cached, then the process can proceed to operation 406, where the open directory request is completed directly based on the cached directory enumeration information.

If the directory enumeration information has not been cached, then the process can proceed to operation 408, where the open directory request can be placed into a pending state. The process can then proceed to operation 410, where a request is sent to the client for directory enumeration information for the requested directory. In operation 412, the requested directory enumeration information can be received from the client over a fast side channel. For example, the client can query the directory in the shared client drive for the directory enumeration information and convey the directory enumeration information to the virtual desktop. In operation 414, the received directory enumeration information can be cached on the virtual desktop in a directory cache. In operation 416, the pended open directory request can be completed based on the cached directory enumeration information. In operation 418, the application can enumerate the now opened directory and requests for directory enumeration information from the application can be intercepted and completed directly based on cached directory enumeration information.

Figure 5:
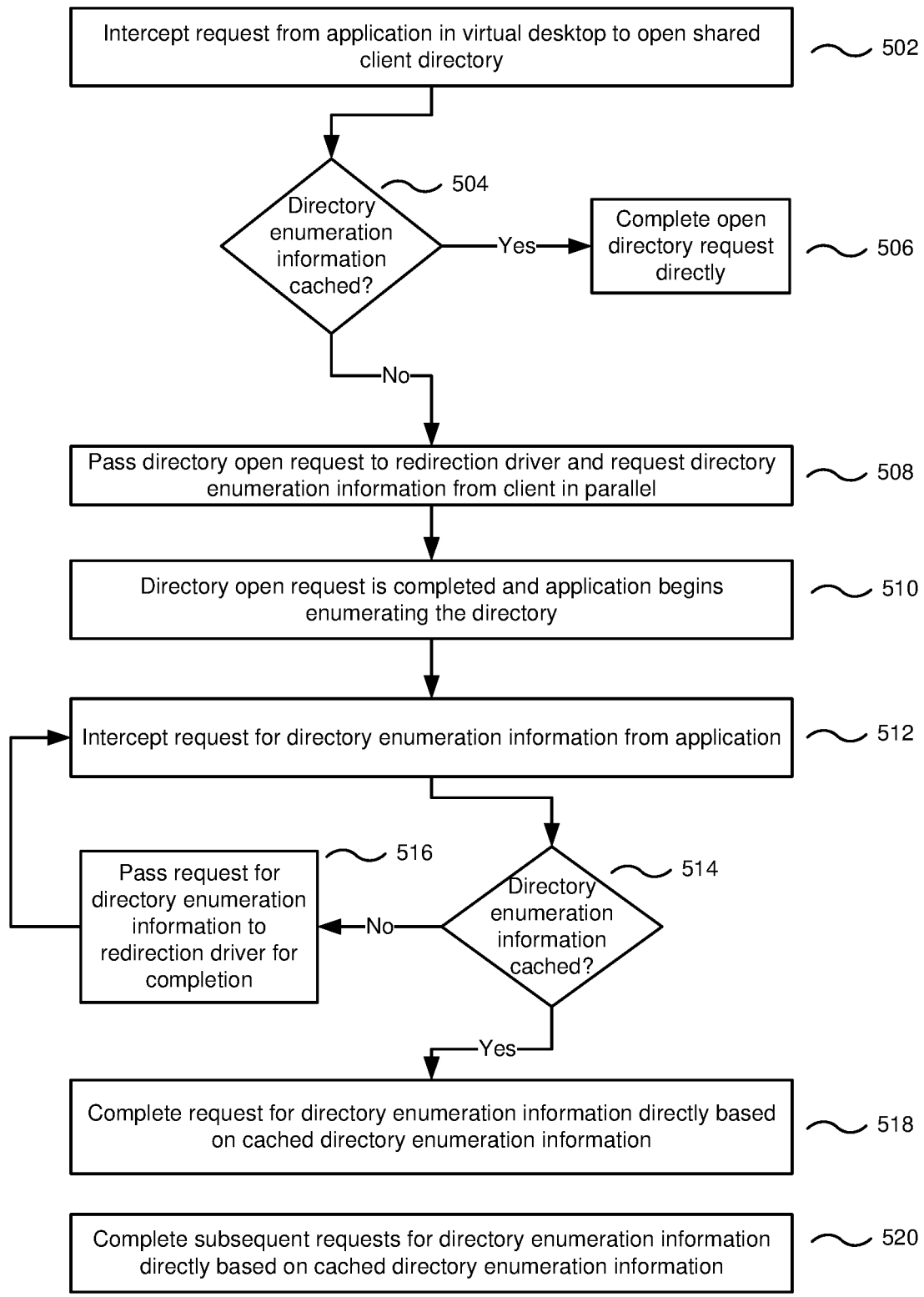
FIG. 5 illustrates an example process flow for more efficient directory enumeration in client drive redirection on virtual desktops with parallel processing, in accordance with various embodiments.

FIG. 5 illustrates an example process flow for more efficient directory enumeration in client drive redirection on virtual desktops with parallel processing, in accordance with various embodiments. For example, the process can take place in a virtual desktop environment that implements CDR to provide access on the virtual desktop to a shared client drive on the client device via a corresponding virtual drive that is presented to applications in the virtual desktop. As illustrated in the example of FIG. 5, the process can begin by intercepting a request from an application in the virtual desktop to open a shared client directory, in operation 502. For example, the application may be attempting to open a directory in the virtual drive. In operation 504, a decision can be made on whether directory enumeration information for the requested drive has been cached in the directory cache in the virtual desktop. If the directory enumeration information has been cached, then the process can proceed to operation 506, where the open directory request is completed directly based on the cached directory enumeration information.

If the directory enumeration information has not been cached, then the process can proceed to operation 508, where the directory open request is passed to the redirection driver and a request for directory enumeration information is sent to the client device in parallel. For example, the redirection driver can forward the request to the client device to be completed. The process can then proceed to operation 510, where the directory open request is completed (e.g., the redirection driver completes the request) and the application begins enumerating the directory. In operation 512, a request for directory enumeration information from the application can be intercepted. For example, the client can query the directory in the shared client drive for the directory enumeration information and convey the directory enumeration information to the virtual desktop.

In operation 514, a decision can be made on whether directory enumeration information for the requested drive has been cached in the directory cache in the virtual desktop. If the directory enumeration information for the requested drive has not been cached, the process can proceed to operation 516, where the request for directory enumeration information is passed to the redirection driver to be completed. The process can then return to operation 512, where a next request for directory enumeration information from the application can be intercepted. If the directory enumeration information for the requested drive has been cached, the process can proceed to operation 516, where the request for directory enumeration information is completed directly based on the cached directory enumeration information. The process can then proceed to operation 520, where subsequent requests for directory enumeration information are completed directly based on the cached directory enumeration information.

As mentioned earlier, certain file management applications, such as Windows Explorer, use only one thread to enumerate directory entries and then copy files one by one. This greatly limits the copy speed. In various embodiments, the fast channel can be leveraged to maximize copy performance in Windows Explorer and in other file managers, which may be file management applications or file management services part of an operating system.

The process can begin by the file manager (which may be a file management application or service in an OS, such as Windows Explorer) receiving an instruction to copy from a source folder, which can be in a shared client drive on the client device, to a target folder on the virtual desktop. The paths of the source and target folders can be determined or retrieved from the file manager (e.g., intercepted, requested, etc.) and the source folder path can be sent to the fast channel client on the client device, while the target folder path is conveyed to the fast channel server on the virtual desktop. The fast channel client can then use multiple threads to read the file data from the source folder on the client device and then send the file data to the fast channel server. The fast channel server can receive the file data and use multiple threads to write the file data to the target folder on the virtual desktop.

In the meantime, the virtual desktop (e.g., via the CDR accelerator) can interact with the file manager to manipulate it and make it "think" that it is performing the copy, to make it act as if it is performing the copy, or otherwise to simulate the copy process, while preventing the file manager from actually performing the data copy. For example, the file manager may be manipulated to produce a "fake" copy, so that it goes through the steps of producing a copy but does not actually copy any data. Furthermore, the progress of the actual copy operation over the fast channel may be "synced" with the file manager so it displays accurate status and progress indications, such as a progress bar, completion message, etc. In various embodiments, the virtual desktop (e.g., via the CDR accelerator) can send dummy messages to the file manager as well as intercept requests from the file manager and send dummy responses to achieve this and to have the file manager behave as if it is handling the copy process, such as by displaying a progress bar, displaying notifications, etc. As a result, the file manager may behave as if it has performed the copy operation, and it may appear this way to the user and to the system, while the operation is actually performed by the fast channel server and client over the fast channel using multiple threads to read and write the data from/to the source and target folders.

Figure 6:
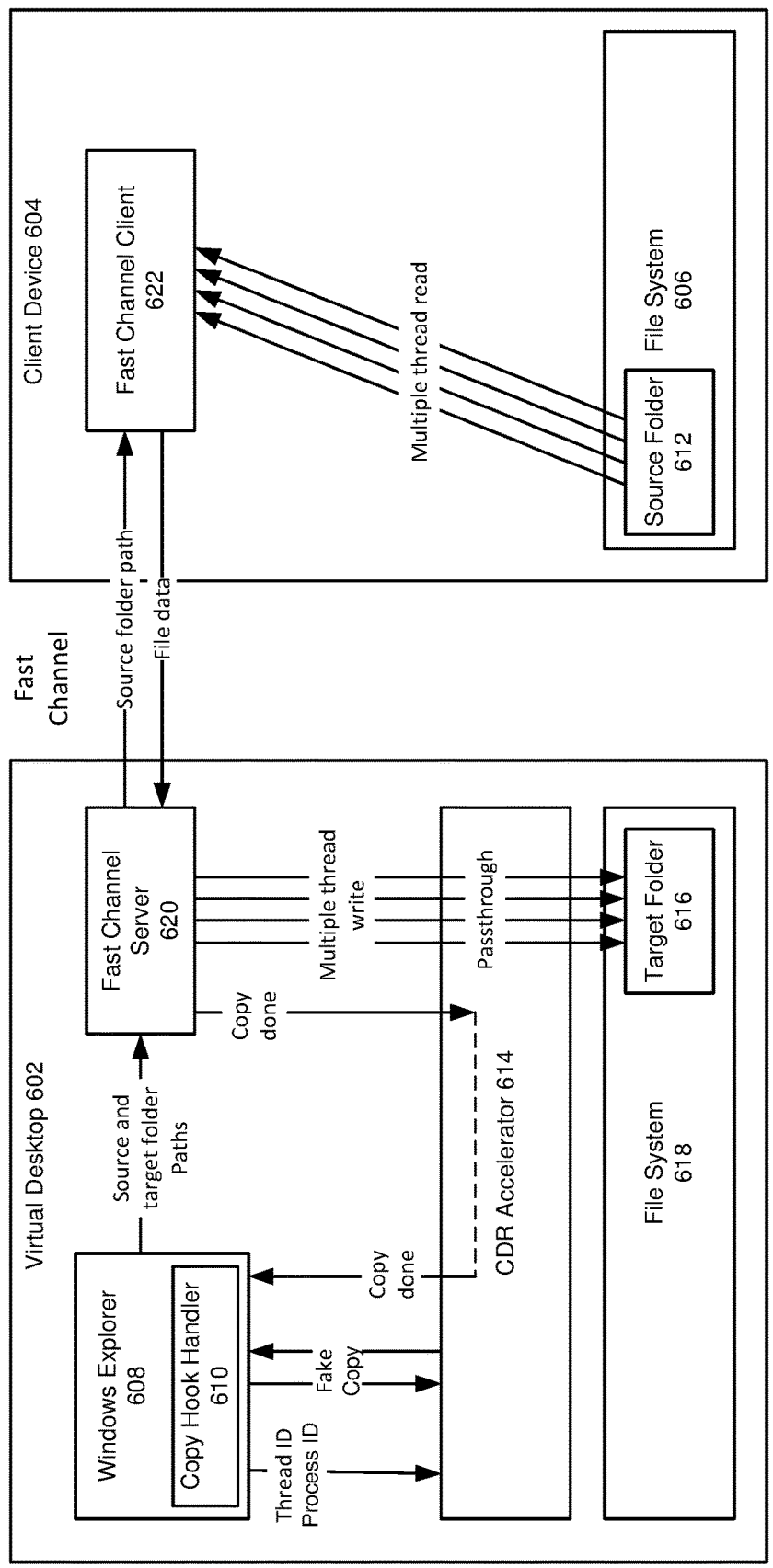
FIG. 6 illustrates an example architecture of a system for more efficient data copy in client drive redirection on virtual desktops utilizing a fast side channel, in accordance with various embodiments.

FIG. 6 illustrates an example architecture of a system for more efficient data copy in client drive redirection on virtual desktops utilizing a fast side channel, in accordance with various embodiments. For the sake of being concise, the example of FIG. 6 describes client-to-agent copy; however, the same approach can apply to agent-to-client copy as well. As illustrated in the example of FIG. 6, a virtual desktop 602 can be connected to a client device 604 over a network during a virtual desktop session. The virtual desktop 602 and the client 604 can implement the efficient directory enumeration in client drive redirection functions utilizing a fast channel described herein. Accordingly, the system illustrated in the example of FIG. 6 can contain the components and perform the functions described with respect to the example system of FIG. 3, although several components and elements have been omitted in the example of FIG. 6 for the sake of being concise.

While the example of FIG. 6 discusses Windows Explorer specifically, as mentioned above, a similar approach can be implemented with other file management services and file management applications, which may be part of an OS.

As illustrated, Windows Explorer 608 is executing in the virtual desktop 602. As mentioned previously, Windows Explorer uses a single thread to perform copy operations, which can be a significant performance limitation. In various embodiments, to overcome this limitation the fast channel can be utilized to carry out the copy operation once folder copy is initiated (e.g., by a user).

As illustrated, a copy hook handler 610, which is a Microsoft component for interface access that can be called with a copy hook callback function, can be installed for the Windows Explorer 608. In this example, a source folder 612 in the client file system 606 is being copied to a target folder 616 in the virtual desktop file system 618. The source folder 612 may be located in a shared client drive (not illustrated) on the client device that is accessible by applications in the virtual desktop 602 through CDR. In various embodiments, the copy hook handler 610 can be invoked in a Windows Explorer 608 copy thread with the source folder 612 path and the target folder 616 path as the parameters in order to leverage the fast channel (between the fast channel server 620 and the fast channel client 622) to implement multi-thread copy.

The process can begin with the Windows Explorer 608 starting a folder copy operation (e.g., when instructed by a user), which can trigger the copy hook 610 callback function to be called. Once called, the copy hook callback function can send the source folder 612 path and the target folder 616 path to the fast channel server 620. The fast channel server 620 can send the source folder 612 path to the fast channel client 622. Then, the fast channel client 622 can start to read files from the source folder 612 using multiple threads to read the data. The fast channel client 622 can send the read file data across the fast channel to the fast channel server 620. In the meantime, the copy hook callback can send a message (e.g., an IOCTL/FltMessage) to the CDR accelerator 614 to notify it of the Explorer copy thread ID and the Explorer PID (process ID), which can turn on a "quick completion" mode ("fake" copy) for the Windows Explorer copy thread. After receiving the file data, the fast channel server 620 can use multiple threads to write the data to the target folder 616, for which it received the path previously from the copy hook handler 610. The CDR acceleration 614 can allow the write data to pass through. For example, the CDR accelerator 614 can pass the writes from the fast channel server 620 as IRP_MJ_WRITEs.

In the meantime, the Explorer copy thread can start to work and the CDR accelerator 614 can intercept the Explorer copy thread's IRPs. The CDR accelerator 614 can intercept the IRP_MJ_CREATE on the target folder 616 and return STATUS_REPARSE so that the Explorer copy thread will open a temp file. For other IRPs, the CDR accelerator 614 can quickly complete the IRP, except the last file copy IRP. Since the directory entries have already been cached, the CDR accelerator 614 can determine if a current IRP is for the last file copy and if so, it can put the IRP in a pending state.

In an embodiment, to more realistically simulate the copying progress of Windows Explorer 608, additional interaction can take place between the CDR accelerator 614 and the fast channel server 620, such as sending a notification when a file is saved to the staging folder, so that the CDR accelerator 614 can better control the progress bar of the Windows Explorer copy thread.

Once the fast channel server 620 completes saving the last file to the target folder 616, it can send a message (e.g., an IOCTL/FltMessage) to the CDR accelerator 614 to notify it of the copy done event. The CDR accelerator can receive the copy done event and it can complete the pended IRP, which can make the copy progress bar disappear and finish the folder copy process.

Generally, the copy hook interface can only be called for folder operations. In other embodiments, the hook IFileOperation interface can also be utilized to more accurately determine what Windows Explorer is doing and then use Fast Channel to accelerate the file/folder copy.

Figure 7:
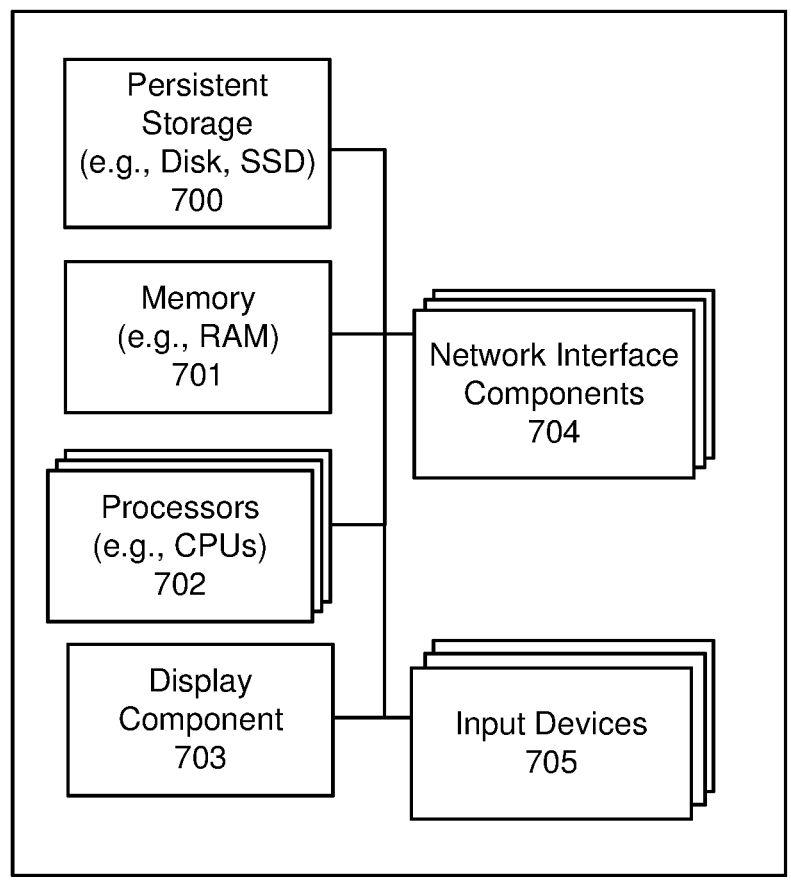
FIG. 7 illustrates an example of some general components of a computing device, in accordance with various embodiments.

FIG. 7 illustrates an example of some general components of a computing device, in accordance with various embodiments. In this particular example, the device includes one or more processors (e.g., central processing units (CPUs) 702 for executing instructions that can be stored in a storage medium component. The storage medium can include many types of memory, persistent data storage, or non-transitory computer-readable storage media. For example, the storage medium may take the form of random access memory (RAM) 701 storing program instructions for execution by the processor(s) 702, a persistent storage (e.g., disk or SSD) 700, a removable memory for sharing information with other devices and/or the like. The computing device typically can further comprise a display component 703, such as a monitor, a touch screen, liquid crystal display (LCD), or the like. In various embodiments, the computing device will include at least one input device 705 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 704 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
   establishing, over a network, a virtual desktop session between a virtual desktop executing on a host server and a client device;
   presenting a virtual drive in the virtual desktop corresponding to a shared client drive located on the client device, wherein a redirection driver executing in the virtual desktop is configured to route input and output requests targeting the virtual drive made by applications running in the virtual desktop to the shared client drive on the client device;
   by a client drive redirection (CDR) accelerator executing in the virtual desktop,
       receiving directory enumeration information for a directory in the shared client drive from the client device;
       caching the received directory enumeration information in a directory cache residing on the virtual desktop;
       intercepting a request targeting the virtual drive made by an application running in the virtual desktop for at least a portion of the directory enumeration information; and
       completing the request based on the directory enumeration information in the directory cache.

2. The method of claim 1, wherein a fast channel client executing on the client device queries the shared client drive for the directory enumeration information and conveys the directory enumeration information to the CDR accelerator over a side channel.

3. The method of claim 1, further comprising:
   by the CDR accelerator, prior to receiving the directory enumeration information for the directory in the shared client drive from the client device,
       intercepting a previous request targeting the virtual drive made by the application running in the virtual desktop for at least a portion of the directory enumeration information;
       determining that the directory cache does not contain the directory enumeration information; and
       in response to determining that the directory cache does not contain the directory enumeration information, requesting the directory enumeration information from the client device.

4. The method of claim 3, wherein the request made by the application is a request to open the directory.

5. The method of claim 1, further comprising:
   receiving by the CDR accelerator a message from the client device informing it of a change to the directory enumeration information and applying the change to the cached directory enumeration information, wherein a file monitor executing on the client device, intercepts a request from an application running on the client device to modify the directory on the client device or a file or subdirectory contained in the directory; and determines the change to the directory enumeration information based on the modification.

6. The method of claim 1, further comprising:

by the CDR accelerator, intercepting a request from the application or a second application running in the virtual desktop to modify the directory in the virtual drive or a file or subdirectory contained in the directory;

determining a change to the directory enumeration information based on the modification; and applying the change to the cached directory enumeration information.

7. The method of claim 1, further comprising:

receiving a request at a file manager in the virtual desktop to copy file data from a source folder located in the shared client drive on the client device to a target folder on the virtual desktop;

preventing the file manager from performing the file data copy;

by a fast channel client operating on the client device, reading the file data from the source folder and conveying the data over a side channel to a fast channel server operating in the virtual desktop; and by the fast channel server, writing the file data to the target folder.

8. A computing device, comprising:

at least one processor; and memory including instructions that, when executed by the at least one processor, cause the computing device to perform the steps of:

establishing, over a network, a virtual desktop session between a virtual desktop executing on a host server and a client device;

presenting a virtual drive in the virtual desktop corresponding to a shared client drive located on the client device, wherein a redirection driver executing in the virtual desktop is configured to route input and output requests targeting the virtual drive made by applications running in the virtual desktop to the shared client drive on the client device;

by a client drive redirection (CDR) accelerator executing in the virtual desktop, receiving directory enumeration information for a directory in the shared client drive from the client device;

caching the received directory enumeration information in a directory cache residing on the virtual desktop;

intercepting a request targeting the virtual drive made by an application running in the virtual desktop for at least a portion of the directory enumeration information; and completing the request based on the directory enumeration information in the directory cache.

9. The computing device of claim 8, wherein a fast channel client executing on the client device queries the shared client drive for the directory enumeration information and conveys the directory enumeration information to the CDR accelerator over a side channel.

10. The computing device of claim 8, wherein the memory further includes instructions that when executed by the at least one processor, cause the computing device to perform the steps of:

by the CDR accelerator, prior to receiving the directory enumeration information for the directory in the shared client drive from the client device, intercepting a previous request targeting the virtual drive made by the application running in the virtual desktop for at least a portion of the directory enumeration information;

determining that the directory cache does not contain the directory enumeration information; and in response to determining that the directory cache does not contain the directory enumeration information, requesting the directory enumeration information from the client device.

11. The computing device of claim 10, wherein the request made by the application is a request to open the directory.

12. The computing device of claim 8, wherein the memory further includes instructions that when executed by the at least one processor, cause the computing device to perform the steps of:

receiving by the CDR accelerator a message from the client device informing it of a change to the directory enumeration information and applying the change to the cached directory enumeration information, wherein a file monitor executing on the client device, intercepts a request from an application running on the client device to modify the directory on the client device or a file or subdirectory contained in the directory; and determines the change to the directory enumeration information based on the modification.

13. The computing device of claim 8, wherein the memory further includes instructions that when executed by the at least one processor, cause the computing device to perform the steps of:

by the CDR accelerator, intercepting a request from the application or a second application running in the virtual desktop to modify the directory in the virtual drive or a file or subdirectory contained in the directory;

determining a change to the directory enumeration information based on the modification; and applying the change to the cached directory enumeration information.

14. The computing device of claim 8, wherein the memory further includes instructions that when executed by the at least one processor, cause the computing device to perform the steps of:

receiving a request at a file manager in the virtual desktop to copy file data from a source folder located in the shared client drive on the client device to a target folder on the virtual desktop;

preventing the file manager from performing the file data copy;

by a fast channel client operating on the client device, reading the file data from the source folder and conveying the data over a side channel to a fast channel server operating in the virtual desktop; and by the fast channel server, writing the file data to the target folder.

15. A non-transitory computer readable storage medium comprising one or more sequences of instructions, the instructions when executed by one or more processors causing the one or more processors to execute the operations of:

establishing, over a network, a virtual desktop session between a virtual desktop executing on a host server and a client device;

presenting a virtual drive in the virtual desktop corresponding to a shared client drive located on the client device, wherein a redirection driver executing in the virtual desktop is configured to route input and output requests targeting the virtual drive made by applications running in the virtual desktop to the shared client drive on the client device;

by a client drive redirection (CDR) accelerator executing in the virtual desktop, receiving directory enumeration information for a directory in the shared client drive from the client device;

caching the received directory enumeration information in a directory cache residing on the virtual desktop;

intercepting a request targeting the virtual drive made by an application running in the virtual desktop for at least a portion of the directory enumeration information; and completing the request based on the directory enumeration information in the directory cache.

16. The non-transitory computer readable storage medium of claim 15, wherein a fast channel client executing on the client device queries the shared client drive for the directory enumeration information and conveys the directory enumeration information to the CDR accelerator over a side channel.

17. The non-transitory computer readable storage medium of claim 15, further comprising instructions that when executed by the one or more processors cause the one or more processors to execute the operations of:

by the CDR accelerator, prior to receiving the directory enumeration information for the directory in the shared client drive from the client device, intercepting a previous request targeting the virtual drive made by the application running in the virtual desktop for at least a portion of the directory enumeration information;

determining that the directory cache does not contain the directory enumeration information; and in response to determining that the directory cache does not contain the directory enumeration information, requesting the directory enumeration information from the client device.

18. The non-transitory computer readable storage medium of claim 15, further comprising instructions that when executed by the one or more processors cause the one or more processors to execute the operations of:

receiving by the CDR accelerator a message from the client device informing it of a change to the directory enumeration information and applying the change to the cached directory enumeration information, wherein a file monitor executing on the client device, intercepts a request from an application running on the client device to modify the directory on the client device or a file or subdirectory contained in the directory; and determines the change to the directory enumeration information based on the modification.

19. The non-transitory computer readable storage medium of claim 15, further comprising instructions that when executed by the one or more processors cause the one or more processors to execute the operations of:

by the CDR accelerator, intercepting a request from the application or a second application running in the virtual desktop to modify the directory in the virtual drive or a file or subdirectory contained in the directory;

determining a change to the directory enumeration information based on the modification; and applying the change to the cached directory enumeration information.

20. The non-transitory computer readable storage medium of claim 15, further comprising instructions that when executed by the one or more processors cause the one or more processors to execute the operations of:

receiving a request at a file manager in the virtual desktop to copy file data from a source folder located in the shared client drive on the client device to a target folder on the virtual desktop;

preventing the file manager from performing the file data copy;

by a fast channel client operating on the client device, reading the file data from the source folder and conveying the data over a side channel to a fast channel server operating in the virtual desktop; and by the fast channel server, writing the file data to the target folder.

* * * * *